L. R. OAKES.
POULTRY FEEDER.
APPLICATION FILED OCT. 3, 1914.
1,168,902.
Patented Jan. 18, 1916.
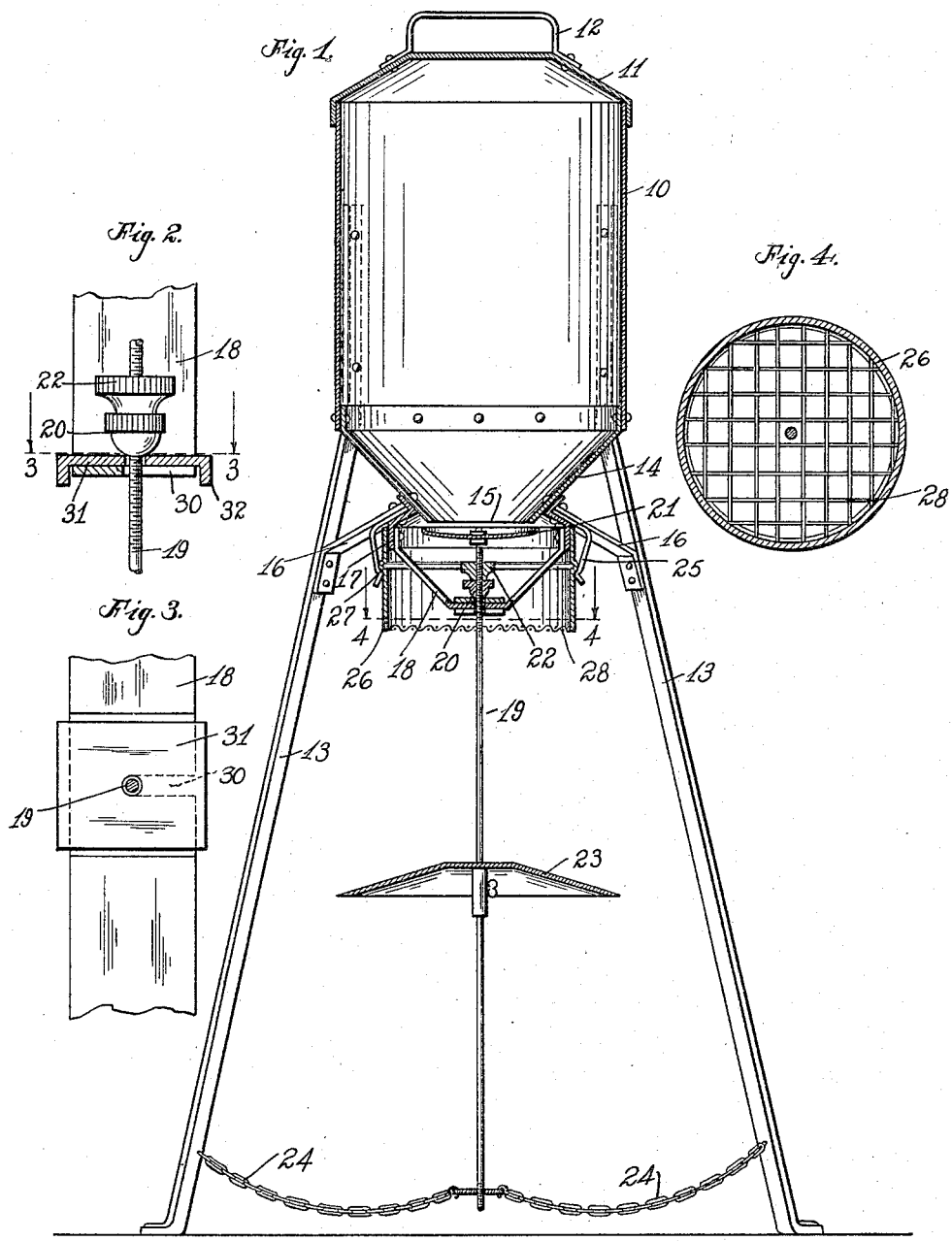
WITNESSES:
INVENTOR
Lucian R. Oakes.
BY
ATTORNEY

UNITED STATES PATENT OFFICE.

LUCIAN R. OAKES, OF TIPTON, INDIANA, ASSIGNOR TO THE OAKES MANUFACTURING COMPANY, OF TIPTON, INDIANA, A CORPORATION.

POULTRY-FEEDER.

1,168,902.           Specification of Letters Patent.     Patented Jan. 18, 1916.

Application filed October 3, 1914. Serial No. 864,884.

*To all whom it may concern:*

Be it known that I, LUCIAN R. OAKES, a citizen of the United States, and a resident of Tipton, county of Tipton, and State of Indiana, have invented a certain new and useful Poultry-Feeder; and I do hereby declare that the following is a full, clear, and exact description thereof, reference being had to the accompanying drawings, in which like letters refer to like parts.

The object of this invention is to provide a mechanical means for feeding chickens and the like to be operated by the chickens.

It consists of a hopper for holding the grain and a pendulum like structure extending near the ground which holds the grain within the hopper when stationary, but when vibrated by chickens moving said pendulum, it allows the feed to drop from the hopper to the ground. This does away with the necessity of giving attention to feeding chickens and the like.

The full nature of the invention will be understood from the accompanying drawings and the following description and claims.

In the drawings, Figure 1 is a vertical cross section taken through the entire device. Fig. 2 is a cross section on the line 2—2 of Fig. 1. Fig. 3 is a cross section on the line 3—3 of Fig. 2. Fig. 4 is a plan view of the screen taken on the line 4—4 of Fig. 1.

There is a hopper 10 for storing the grain which has a lid 11 and a handle 12. Riveted to the outside of said hopper there are three standards or legs 13 holding the hopper at a height from the ground. At the lower end of the hopper there are tapering sides 14 and an outlet 15. Connecting the sides 14 with the standards are braces 16. There is a tubular projection 17 secured to the sides 14 and projecting downward therefrom. Secured to this projection 17 there is a bracket 18 which hangs downwardly and supports a pendulum rod 19 by a ball shaped nut 20 adapted to freely rotate on the bracket 18 through which the rod 19 extends upward and is secured to a plate 21 which is slightly cupped and of greater diameter than the outlet 15. In the bracket 18 there is a slot 30 in which the rod 19 may be easily placed or removed. There is a plate 31 with downwardly turned edges 32 for engaging said bracket, through which the rod passes and on which the ball shaped nut 20 rests. Thus the pendulum portion of the device may be readily removed or replaced by inserting it in the slot 30 and dropping the edges of the plate 31 over the bracket 18 which holds it securely in place. The pendulum 19 is free to swing from the bracket 18 on the ball shaped nut 20 which is secured by a lock nut 22. Adjustably secured to the rod 19 there is a plate 23 with a slightly down turned upper surface.

The lower end of the rod 19 is loosely secured by chains 24 to the three standards 13, one of which is not here shown. There is a spring 25 supported downwardly from the brace 16 which is adapted to slide over and catch a circular member 26 by means of a bead 27. The upper end of said circular member is open and the lower end is provided with a large mesh screen 28. This device is operated by the chickens stepping on or moving the chain 24 which causes the rod 19 to swing back and forth. This causes the movement of the plate 21 which is kept full to the brim with grain from the hopper. When this plate moves, the grain will fall over the edges and through the screen 28 onto the plate 23 which will scatter and spread the grain for the chickens to gather. The member 26 with the screen 28 is placed about the outlet of the hopper to protect the grain from rats and other animals and fowls.

The invention claimed is:

1. A chicken feeder having a hopper with an outlet, means for supporting the hopper in an elevated position, means suspended from the hopper for controlling the outlet thereof and extending down to the lower end of the means for supporting the hopper, and chains extending loosely from the lower end of said hopper outlet controlling means to the lower end of the hopper supporting means.

2. A chicken feeder having a hopper with an outlet, legs for supporting said hopper, a rod suspended from said hopper down to the lower end of the legs, means on said rod for controlling the outlet of the hopper, and chains loosely extending from the lower end of said rod to the lower ends of said legs.

3. A chicken feeder having an elevated hopper with an outlet opening, means connected with said hopper and suspended therefrom for controlling the outlet, and means removably mounted in connection with the lower part of said hopper for preventing access to the outlet of the hopper and having perforations large enough to permit the escape of the grain from the hopper.

4. A chicken feeder having a hopper, means for supporting said hopper, a tubular projection surrounding the outlet at the lower end thereof, a pan open at the top and surrounding said projection and having a screen bottom for protecting the grain in said outlet, means within said pan for feeding the grain from the hopper, a bead surrounding said pan, and springs attached to said hopper for engaging said head and removably supporting said pan.

5. A chicken feeder having a hopper, means for supporting said hopper, a pendulum rod, a plate secured to the upper end of said rod, a downwardly extending bracket secured to said hopper and having a slot therein for receiving said rod, a rectangular plate through which said rod extends and having downwardly turned flanges for engaging said bracket, and a nut secured to said rod and adapted to rest on said rectangular plate so that said rod and plate may be readily removed from said bracket.

In witness whereof, I have hereunto affixed my signature in the presence of the witnesses herein named.

LUCIAN R. OAKES.

Witnesses:
J. H. WELLS,
R. G. LOCKWOOD.

Copies of this patent may be obtained for five cents each, by addressing the "Commissioner of Patents, Washington, D. C."